(12) United States Patent
Morelli et al.

(10) Patent No.: US 12,334,285 B2
(45) Date of Patent: Jun. 17, 2025

(54) METHOD FOR MANUFACTURING A SWITCHING APPARATUS FOR ELECTRIC SYSTEMS

(71) Applicant: ABB Schweiz AG, Baden (CH)

(72) Inventors: Emanuele Morelli, Azzano San Paolo (IT); Jacopo Bruni, Caselle Lurani (IT); Corrado Rizzi, Fornovo S. Giovanni (IT); Giorgio Forlani, Romano di Lombardia (IT); Luciano Chenet, Torre Boldone (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/860,610

(22) Filed: Jul. 8, 2022

(65) Prior Publication Data

US 2023/0009581 A1   Jan. 12, 2023

(30) Foreign Application Priority Data

Jul. 9, 2021   (EP) ..................... 21184655

(51) Int. Cl.
*H01H 33/662* (2006.01)
*H01H 33/12* (2006.01)

(52) U.S. Cl.
CPC .... *H01H 33/66207* (2013.01); *H01H 33/121* (2013.01); *H01H 33/66261* (2013.01)

(58) Field of Classification Search
CPC ........... H01H 33/66207; H01H 33/121; H01H 33/66261; H01H 33/56; H01H 9/02; H01H 9/04; H01H 11/00; B29C 66/1142; B29C 66/1312; B29C 66/232; B29C 66/30223;
(Continued)

(56) References Cited

U.S. PATENT DOCUMENTS

| 3,959,577 | A | * | 5/1976 | Frink | .................. H05K 5/066 218/68 |
| 4,648,722 | A | * | 3/1987 | Mock | ................ B29C 66/12842 968/374 |
| 7,377,394 | B2 | * | 5/2008 | Buss | .................. B65D 83/0463 206/538 |

FOREIGN PATENT DOCUMENTS

| CN | 102269087 A | 12/2011 |
| DE | 10216175 * 7/2003 | ......... B29C 65/0672 |

(Continued)

OTHER PUBLICATIONS

Translation of DE10216175 (Original document published Jul. 24, 2003) (Year: 2003).*

(Continued)

*Primary Examiner* — William A Bolton
(74) *Attorney, Agent, or Firm* — McCarter & English, LLP; Michael M. Gnibus

(57) ABSTRACT

The present disclosure is directed to a for manufacturing a switching apparatus for electric systems. The method includes (i) providing a first housing shell of the switching apparatus; (ii) providing a second housing shell of the switching apparatus; (iii) assembling the first and second housing shells and a number of operating components of the switching apparatus, thereby obtaining a preliminary assembly of the switching apparatus; and (iv) joining first and second coupling edges of the first and second housing shells through a vibration welding process, thereby forming a junction between the first and second housing shells and obtaining a sealed outer casing for the switching apparatus.

11 Claims, 14 Drawing Sheets

(58) Field of Classification Search
CPC . B29C 66/322; B29C 66/73921; B29C 65/06;
B29C 65/0618; H05K 5/066
USPC .................................. 218/134, 139, 138, 155
See application file for complete search history.

(56) References Cited

FOREIGN PATENT DOCUMENTS

| | | |
|---|---|---|
| DE | 102012111393 A1 | 5/2014 |
| FR | 2903241 A1 | 1/2008 |

OTHER PUBLICATIONS

Extended European Search Report for corresponding European Patent App. No. 21184655.5, mailed Dec. 22, 2021, 8 pages.

\* cited by examiner

STATE OF THE ART

METHOD FOR MANUFACTURING A SWITCHING APPARATUS FOR ELECTRIC SYSTEMS

CROSS-REFERENCE TO RELATED APPLICATIONS

The present application claims the benefit of priority to European Patent Application No. 21184655.5, filed on Jul. 9, 2021, the entire contents of which is incorporated by reference in its entirety herein.

FIELD OF THE DISCLOSURE

The present disclosure relates to a method for manufacturing a switching apparatus for electric systems, for example a load-break switch for medium voltage electric systems.

BACKGROUND

As is known, many switching apparatuses used in secondary distribution electric grids, for example medium-voltage load-break switches, have their electric poles immersed in a pressurized gas in order to ensure a suitable dielectric insulation between live parts and effective arc-quenching capabilities when currents are interrupted.

FIG. 1 shows a load-break switch 101 for medium voltage electric systems, according to an available solution of the state of the art.

The load-break switch 101 includes an outer housing 104 of electrically insulating material, which defines an inner volume, in which operating components 102 of the electric poles of the load-break switch are accommodated.

Conveniently, the inner volume of the load-break switch 101 is filled with a pressurized insulating gas (e.g. at an absolute pressure of 1.5 bar), for example $SF_6$, dry air or another gas having a low environmental impact.

The insulating housing 104 includes an upper housing shell 106 and a lower housing shell 107 joined by a number of bolts or screws 105 at suitable coupling edges 108, 109. A sealing gasket 110 (O-ring) is arranged between the opposite coupling edges 108, 109 in order to ensure a suitable gas tightness.

Traditional methods for manufacturing switching apparatuses of the type shown in FIG. 1 have some criticalities, in particular for what concerns the assembly of the outer housing of the switching apparatus. At present, in fact, this activity is relatively labour-intensive and time-consuming and it has a relatively high impact on the overall manufacturing costs of the switching apparatus.

As an example, in order to ensure an optimal sealing of the switching apparatus, the coupling edges of the housing shells have to be subject to prolonged surface-finishing processes (they have to be almost perfectly planar) and the sealing gasket has to be correctly positioned and greased, which requires the manual intervention of expert personnel.

As a further example, the arrangement of a number of mechanical fasteners to couple the housing shells requires a relatively long time and, again, the manual intervention of expert personnel.

BRIEF DESCRIPTION OF THE DISCLOSURE

The present disclosure provides a method for manufacturing a switching apparatus, which allows solving or mitigating the above-mentioned technical problems.

More particularly, the present disclosure provides a method for manufacturing a switching apparatus, in which making the outer housing requires a relatively short time to be carried out.

The present disclosure further provides a method for manufacturing a switching apparatus, in which making the outer housing is a relatively easy activity to be carried out, even by inexperienced personnel.

The present disclosure also provides a method for manufacturing a switching apparatus, which particularly suitable for being carried out at industrial level, at competitive costs with respect to the traditional manufacturing methods of the state of the art.

The present disclosure provides a switching apparatus, according to the following claims.

In a general definition, the method of the disclosure includes the following steps:
- providing a first housing shell of the switching apparatus, the first housing shell being of thermoplastic material and including a first coupling edge for coupling with another housing shell, the first coupling edge having a first coupling surface and first ribs protruding from the first coupling surface and extending along the first coupling edge. In some embodiments, the first ribs of the first coupling edge have different thicknesses and heights relative to one another;
- providing a second housing shell of the switching apparatus, the second housing shell being of thermoplastic material and including a second coupling edge for coupling with the first housing shell, the second coupling edge having a second coupling surface and second ribs protruding from the second coupling surface and extending along the second coupling edge. In some embodiments, the second ribs of the second coupling edge have different thicknesses and heights relative to one another;
- assembling the first and second housing shells and a plurality of operating components of the switching apparatus, thereby obtaining a preliminary assembly of the switching apparatus. The first and second housing shells are coupled by coupling the first and second coupling edges of the first and second housing shells. One or more first ribs of the first coupling edge are overlapped and in contact to corresponding one or more second ribs of the second coupling edge, when the first and second coupling edges of the first and second housing shells are coupled. One or more spacings are formed between the first and second coupling surfaces and the first and second ribs, when the first and second coupling edges of the first and second housing shells are coupled;
- joining the first and second coupling edges of the first and second housing shells through a vibration welding process, thereby forming a junction between the first and second housing shells and obtaining a sealed outer casing for the switching apparatus.

Conveniently, during the vibration welding process, the thermoplastic material of the overlapped first and second ribs of the first and second coupling edges melts at least partially and fills, at least partially, the one or more spacings formed between the first and second coupling surfaces and the first and second ribs.

According to some embodiments of the disclosure, the step of assembling the first and second housing shells and the operating components includes:

assembling first operating components of the switching apparatus to the first housing shell, thereby forming a first sub-assembly of the switching apparatus;

assembling second operating components of the switching apparatus to the second housing shell, thereby forming a second sub-assembly (8) of the witching apparatus;

assembling the first and second sub-assemblies and third operating components of the switching apparatus, thereby obtaining a preliminary assembly of the switching apparatus.

According to other embodiments of the disclosure, the step of assembling the first and second housing shells and the operating components includes:

assembling fourth operating components of the switching apparatus to the second housing shell, so as to form a main sub-assembly of the switching apparatus;

assembling the main sub-assembly, the first housing shell and fifth operating components of the switching apparatus, thereby obtaining a preliminary assembly of the switching apparatus.

According to an aspect of the disclosure, the first and second housing shells and the operating components of the switching apparatus are assembled in a welding chamber of a vibration welding apparatus. The vibration welding apparatus is then activated for joining the first and second coupling edges of the first and second housing shells through a vibration welding process.

Conveniently, during the vibration welding process, the first and second coupling edges of the first and second housing shells are moved back and forth, relative to each other, along a main vibration direction. According to an aspect of the disclosure, the overlapped first and second ribs of the first and second coupling edges, which are oriented along directions transversal to the vibration direction when the first and second coupling edges are coupled, have a larger thickness compared to the overlapped first and second ribs of the first and second coupling edges, which are oriented along directions parallel to vibration direction, when the first and second coupling edges are coupled.

According to some embodiments, the method of the disclosure includes the step of pre-heating the first and second housing shells before joining the first and second coupling edges of the first and second housing shells through a vibration welding process.

According to some embodiments, the method of the disclosure includes the step of filling the inner volume of the switching apparatus with a pressurized dielectric gas, after the sealed outer casing of the switching apparatus is obtained.

In some embodiments, the switching apparatus is a load-break switch for medium voltage electric systems.

BRIEF DESCRIPTION OF THE DRAWINGS

Further characteristics and advantages of the disclosure will emerge from the description of the described, but not exclusive, embodiments of the switching apparatus, non-limiting examples of which are provided in the attached drawings, wherein.

DETAILED DESCRIPTION OF THE DISCLOSURE

With reference to the figures, the present disclosure relates to a method for manufacturing a switching apparatus for electric systems.

The method of the disclosure is particularly suitable for manufacturing switching apparatuses having electric poles immersed in a pressurized insulation gas, for example $SF_6$ or a more environment-friendly insulation gas, such as mixtures of oxygen, nitrogen, carbon dioxide and/or fluorinated gases.

In particular, the method of the disclosure is particularly suitable for manufacturing medium-voltage load-break switches and, for the sake of brevity, it will be described in the following with particular reference to this kind of switching apparatuses. It is however intended that the method of the disclosure may be successfully employed for manufacturing switching apparatuses of different type, either for low-voltage or medium-voltage applications.

For the purpose of the present application, the term "low voltage" relates to operating voltages, which are lower than 1 kV AC and 1.5 kV DC, while the term "medium voltage" relates to operating voltages, which are higher than 1 kV AC and 1.5 kV DC up to some tens of kV, e.g. up to 72 kV AC and 100 kV DC.

Figure 8:
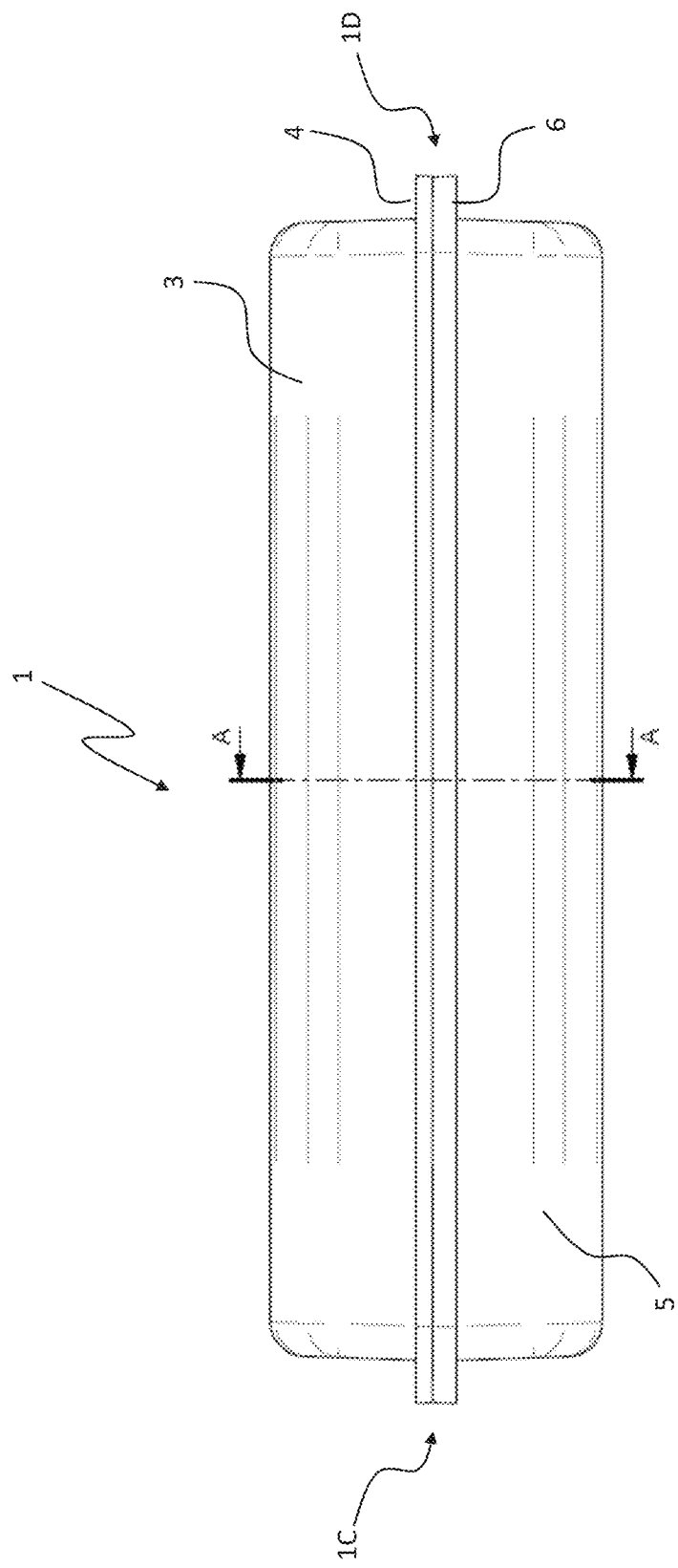
Figure 9:
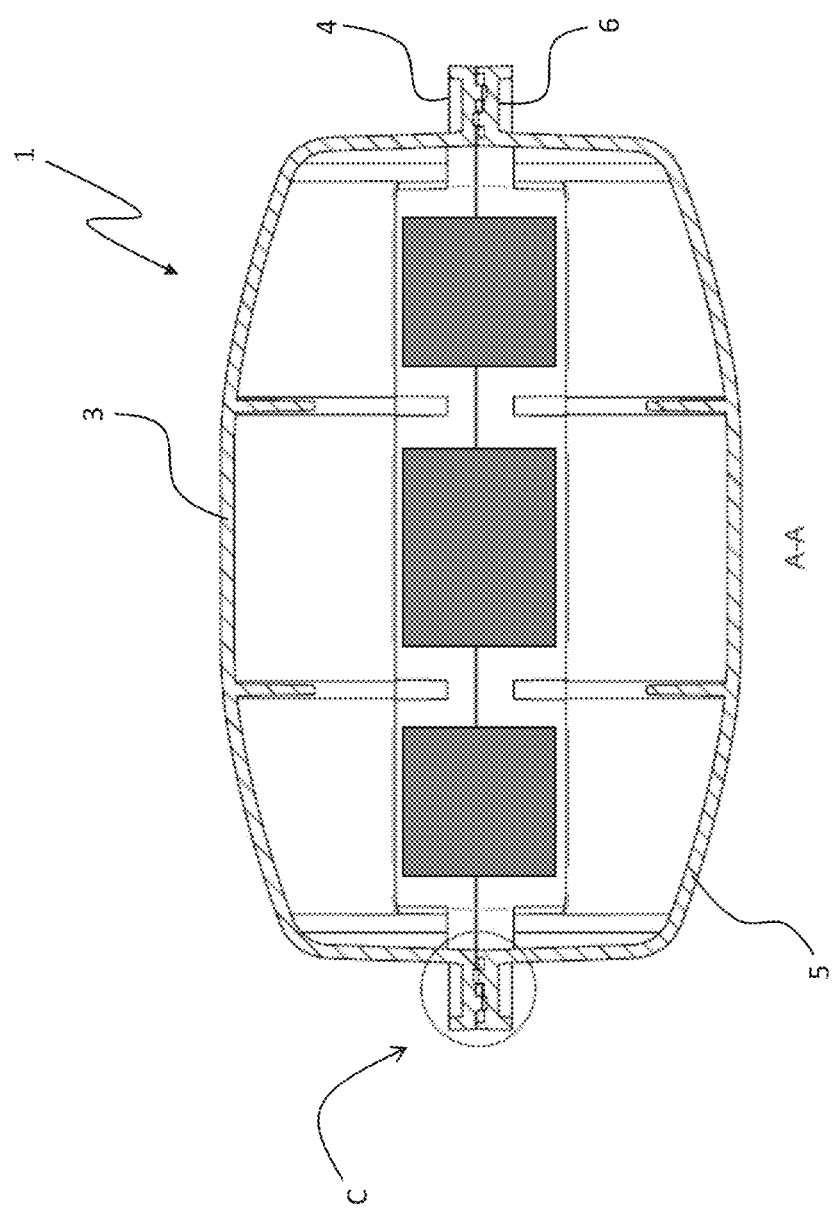
Figure 11:
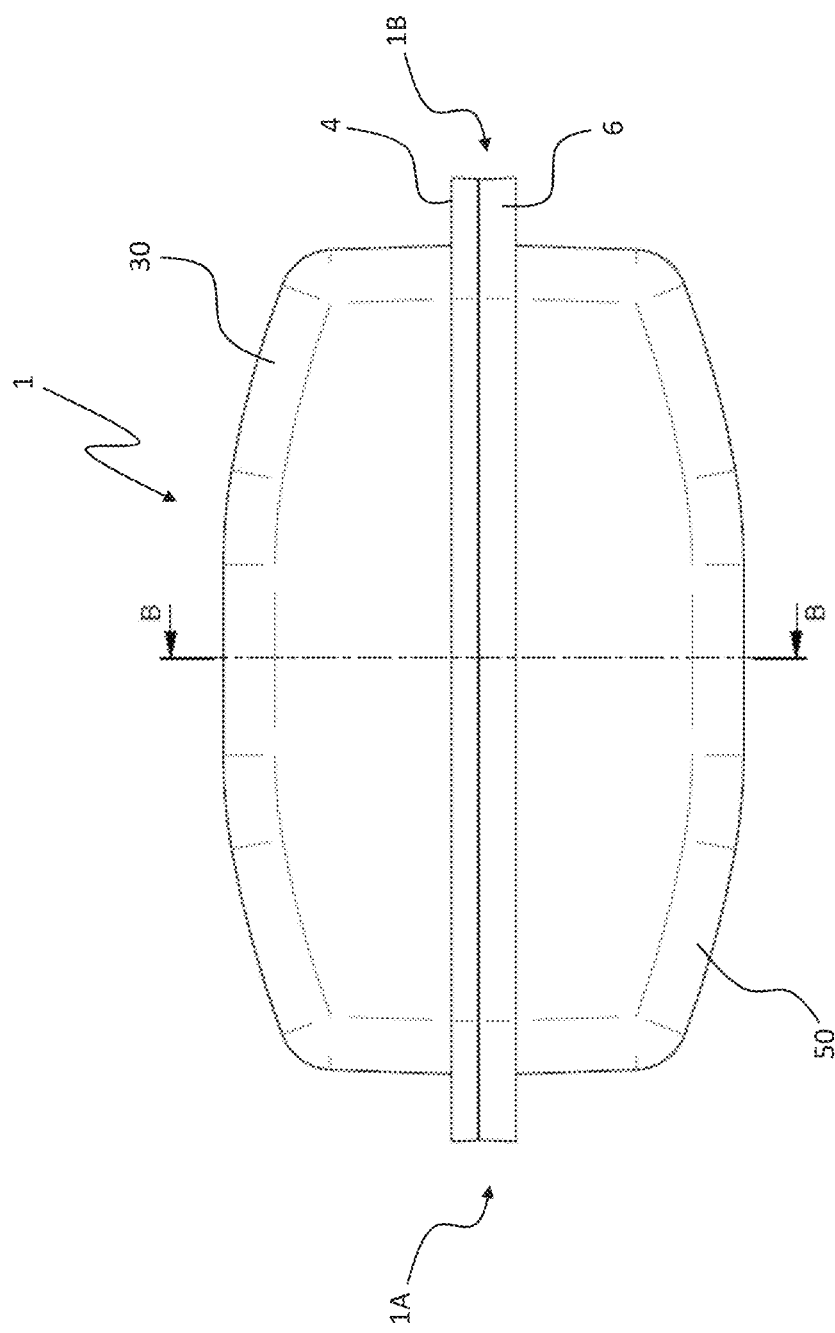
Figure 12:
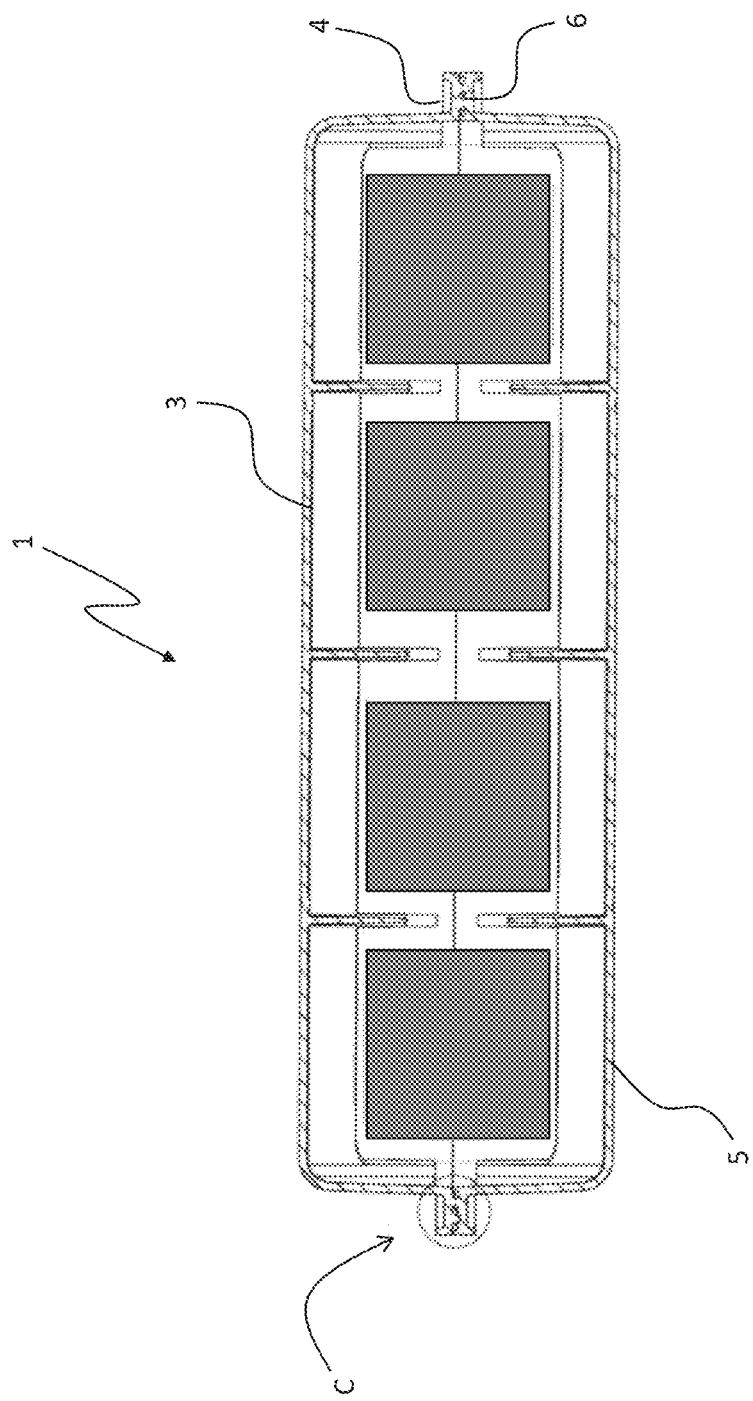

In some embodiments, the switching apparatus 1 has a main longitudinal axis (not shown) and it has opposite first and second sides 1A, 1B (FIG. 11), which are parallel to the main longitudinal axis, and third and fourth opposite sides 1C, 1D (FIG. 8), which are perpendicular to the main longitudinal axis of the switching apparatus.

As shown in FIGS. 8-13, the switching apparatus 1 further has an outer casing 2 and a number of operating components 10, which may include electrical components (e.g. electric contacts, insulators, conductors, and the like), mechanical components (e.g. levers, shafts, connectors, and the like) and electro-mechanical components (e.g. coils, motors, actuators, and the like).

Obviously, some operating components 10 (e.g. electric contacts or bushing) may protrude from the first and second housing shells 3, 5 (by passing through suitable openings—not shown) externally from the volume defined by these latter. These last components, which are typically arranged at suitable openings of the outer casing, are not shown in the above-mentioned figures for the sake of simplicity.

The manufacturing method of the disclosure includes a step of providing a first housing shell 3 of the outer casing 2, which is made of thermoplastic material.

In general, the first housing shell 3 may be realized according to solutions of a known type, for example through a suitable molding process.

Figure 15:
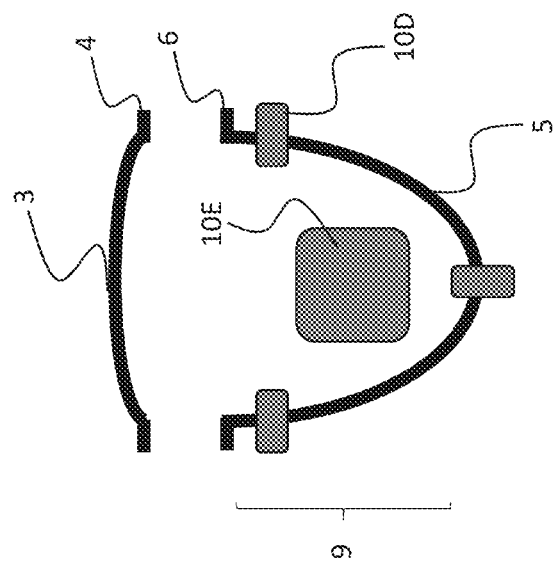
Figure 14:
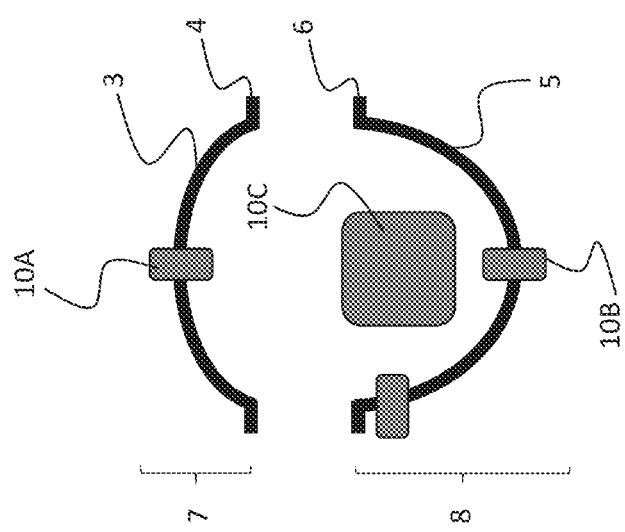

The first housing shell 3 may have a main body shaped as an open container, as shown in FIGS. 1, 2, 6, 8, 12 and 14, or as a shaped cover, as shown in FIG. 15.

In some embodiments, the first housing shell 3 has an elongated shape extending along a main longitudinal direction, which is parallel to the main longitudinal axis of the switching apparatus when the outer casing 2 is formed.

The first housing shell 3 has a first coupling edge 4, at which it is intended for coupling with another housing shell.

The first coupling edge 4 may form the perimeter of the first housing shell 3 (e.g., along a closed-line) and it may protrude externally from the main body of the first housing shell 3 with a planar shape. However, the first coupling edge 4 may be shaped differently depending on the shape of the first housing shell 3.

The first coupling edge 4 includes a first coupling surface 40 with another housing shell.

In some embodiments, the first coupling surface 40 has a planar profile. However, in principle, it may have a different shape (e.g. a corrugated profile), according to the needs.

The first coupling edge 4 further includes a plurality of first ribs 41 protruding from the first coupling surface 40.

The first ribs 41 extend in parallel (side by side) along the first coupling edge 4, thereby following the profile of this latter. Additionally, they are spaced one from the other along a transversal direction (relative to the first coupling edge 4).

Figure 1:
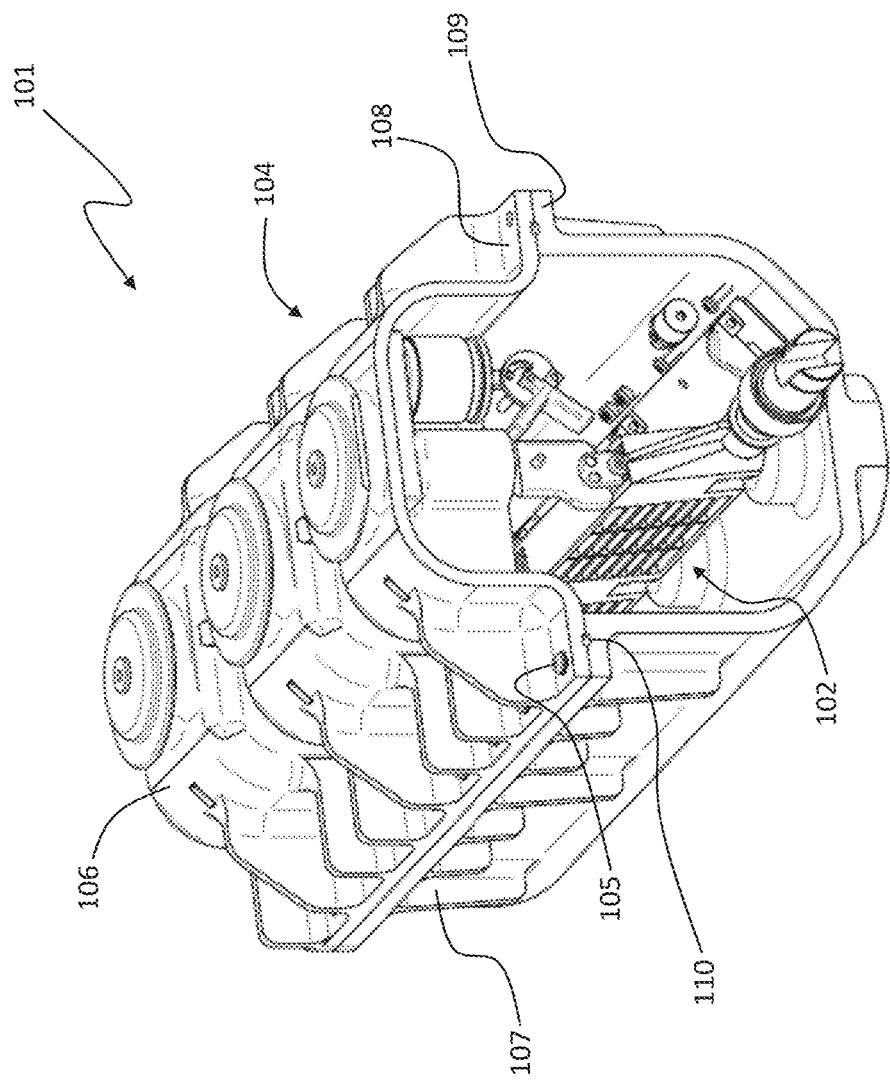
FIG. 1 is a schematic view of a switching apparatus of the state of the art.
Figure 2:
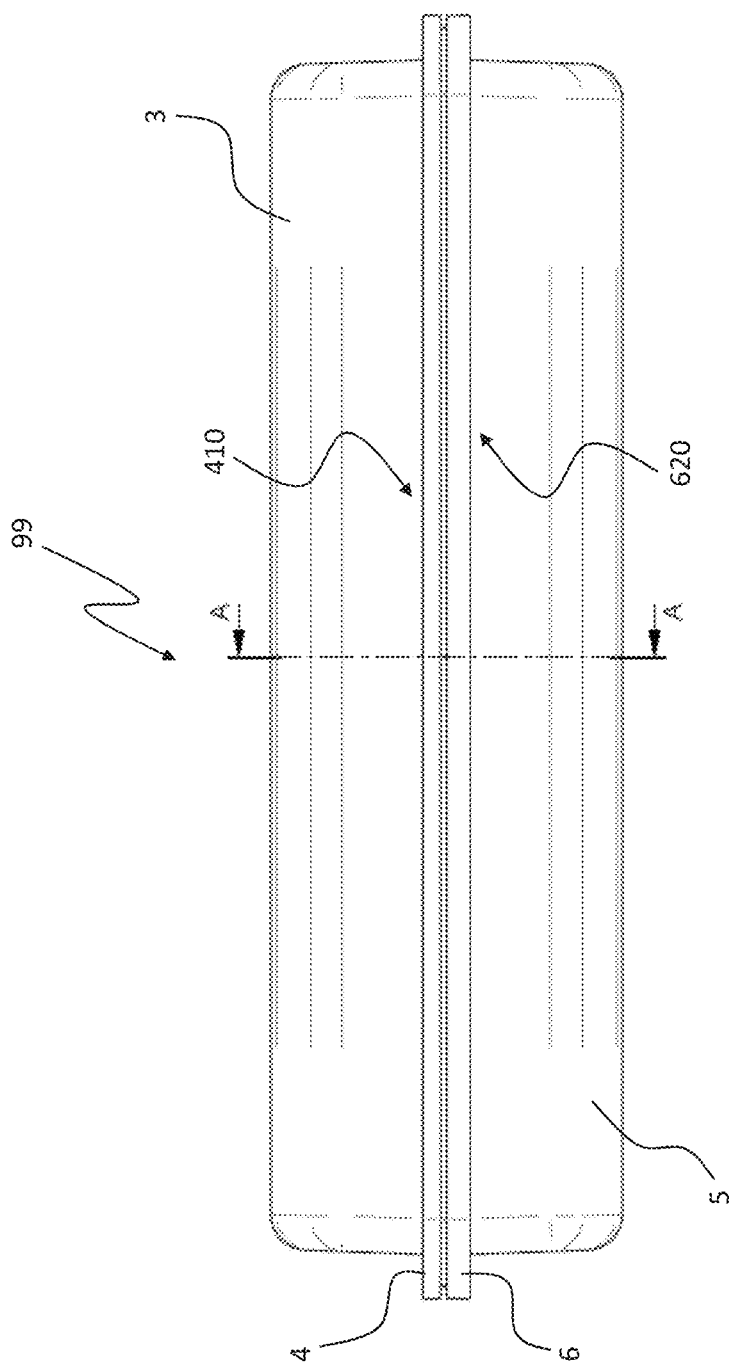
FIGS. 2-15 are schematic views of different steps of the manufacturing method of the disclosure.
Figure 3:
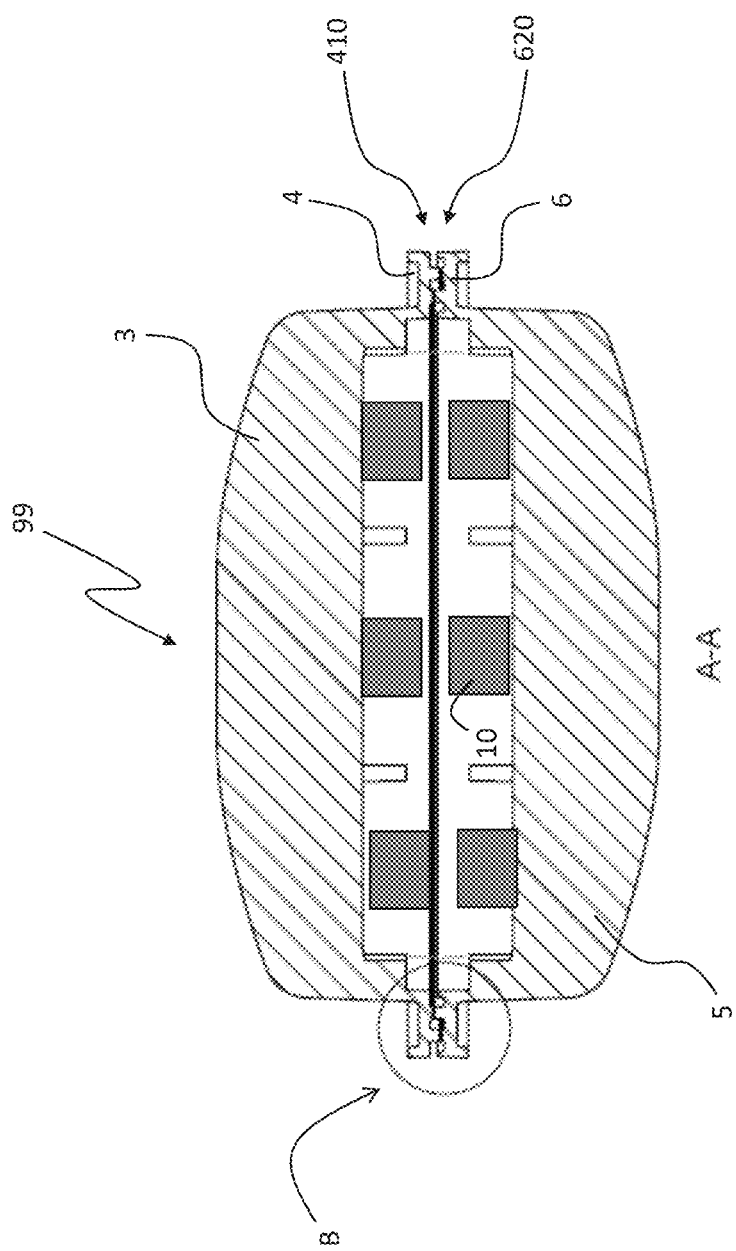
Figure 4:
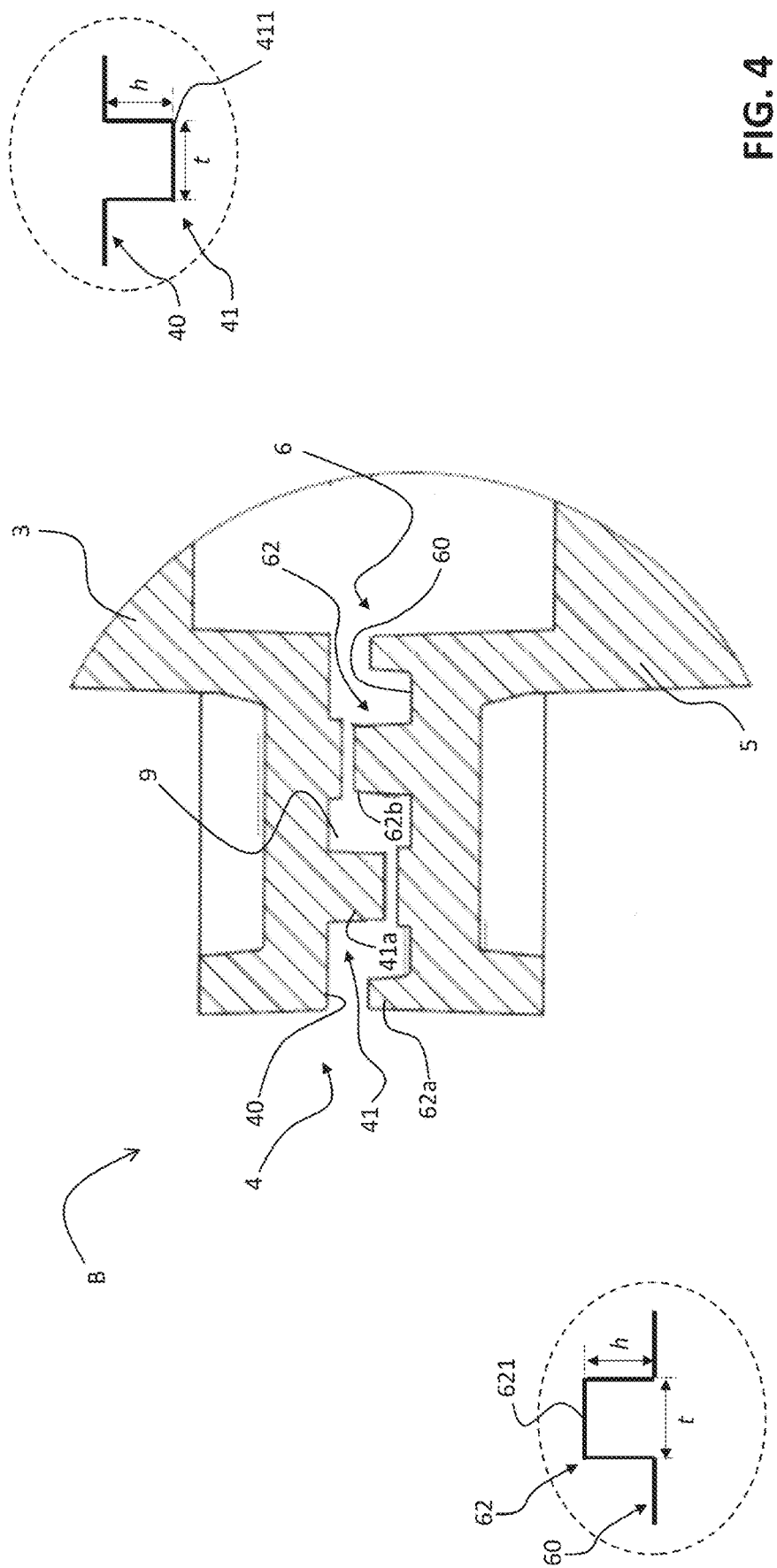
Figure 5:
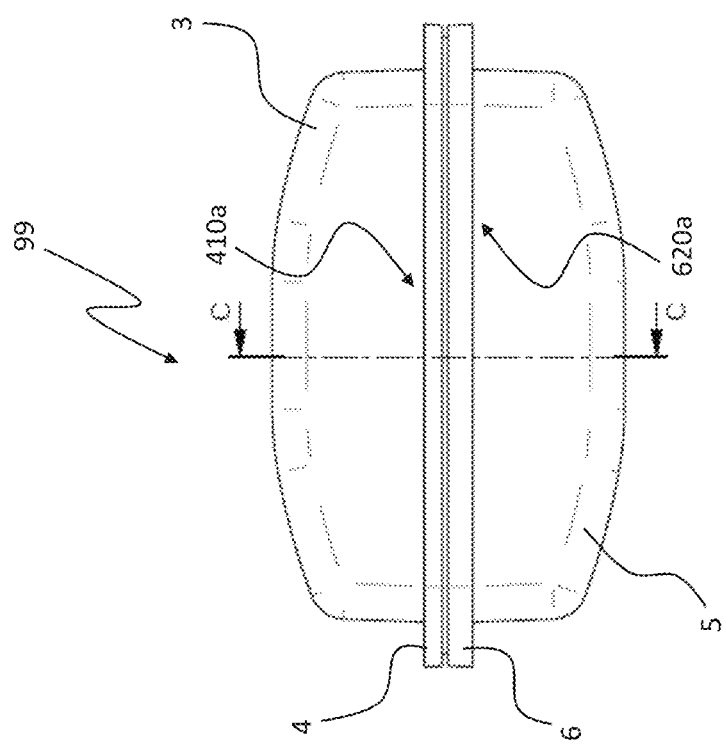
Figure 6:
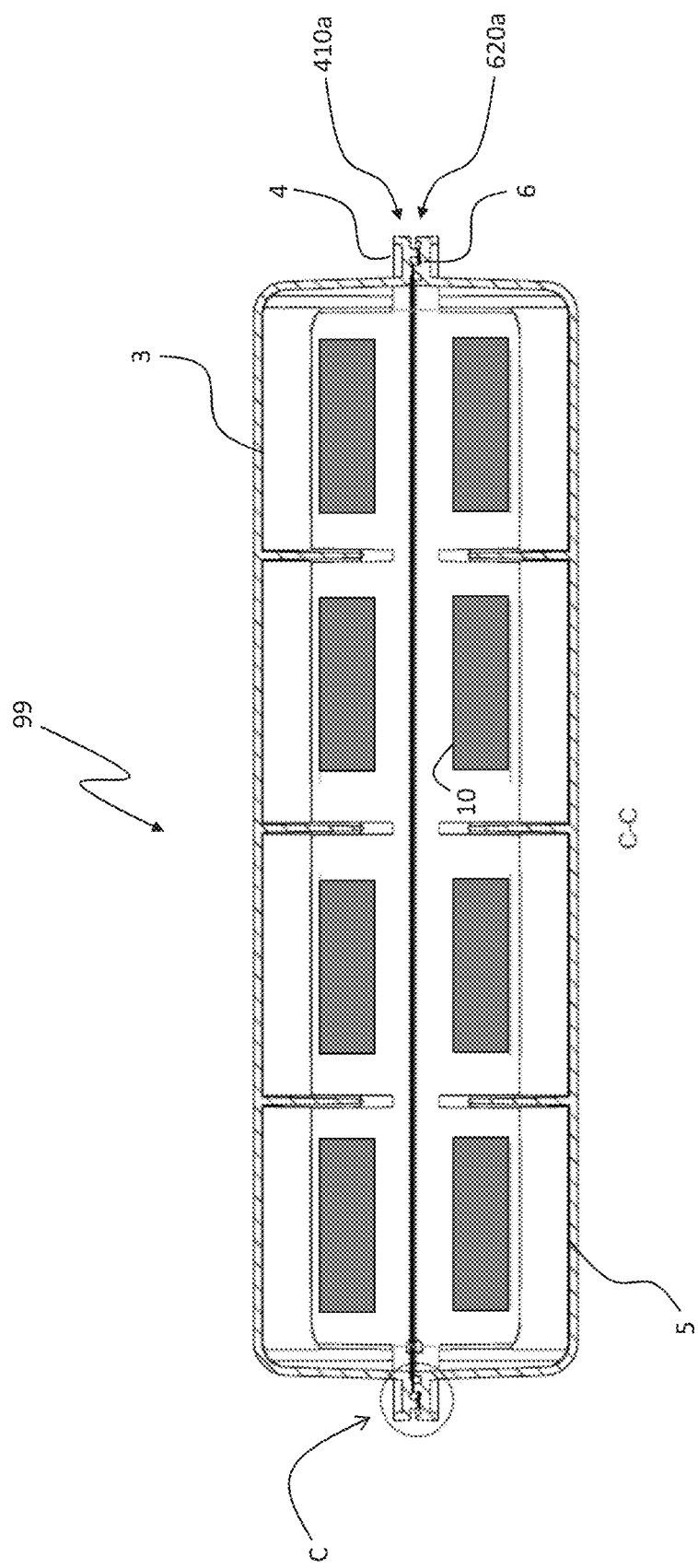
Figure 7:
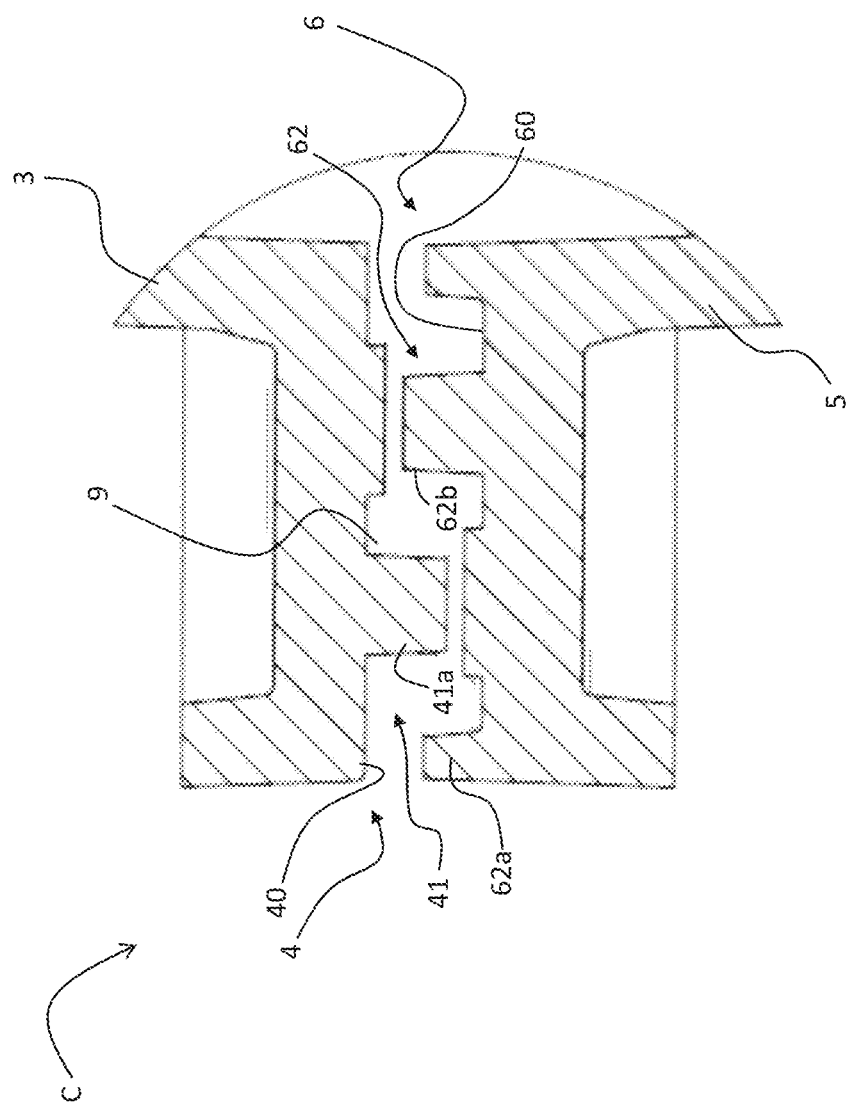

FIGS. 4 and 7 show transversal sections of the first coupling edge 4 along different section planes A-A, C-C (FIGS. 2-3 and 5-6). As it is possible to notice, the first ribs 41 are arranged side-by-side and are transversally spaced one from another.

In some embodiments, the first ribs 41 have a square or rectangular transversal section, as shown in FIGS. 4 and 7. In principle, however, they may have also a different shape, e.g. frustoconical.

In general, as shown in FIG. 4, each first rib 41 has a given height h (the distance between the first coupling surface 40 and the free top surface 411 of each rib) and a given thickness t (the distance between opposite sides of each rib), which may be different relative to one another.

The manufacturing method of the disclosure includes a step of providing also a second housing shell 5 of the outer casing 2.

The second housing shell 5 is made of thermoplastic material and it may be industrially realized in a known manner, for example through a suitable molding process.

The second housing shell 5 may also be realized according to solutions of a known type, for example through a suitable molding process.

The second housing shell 5 may have a main body shaped as an open container, as shown in FIGS. 1, 2, 6, 8, 12, 14 and 15.

In some embodiments, as the first housing shell 3, the second housing shell 5 has an elongated shape extending along a main longitudinal direction, which is parallel to the main longitudinal axis of the switching apparatus when the outer casing 2 is formed.

The second housing shell 5 has a second coupling edge 6, at which it is intended for coupling with another housing shell (the first housing shell 3).

As in the first housing shell 3, the second coupling edge 6 may form the perimeter of the second housing shell 5 (e.g., along a closed-line) and it may protrude externally from the main body of the second housing shell 5 with a planar shape. However, the second coupling edge 6 may be shaped differently depending on the shape of the second housing shell 5.

The first coupling edge 4 includes a second coupling surface 60 for coupling with another housing shell (the first housing shell 3).

In some embodiments, the second coupling surface 60 has a planar profile. However, in principle, it may have a different shape (e.g. a corrugated profile), according to the needs.

The second coupling edge 6 further includes a plurality of second ribs 62 protruding from the second coupling surface 60.

The second ribs 62 extend in parallel (side by side) along the second coupling edge 6, thereby following the profile of this latter, and are spaced one from the other along a transversal direction (relative to the second coupling edge 6).

FIGS. 4 and 7 show transversal sections of the second coupling edge 6 along different section planes A-A, C-C (FIGS. 2-3 and 5-6). As it is possible to notice, the second ribs 62 are arranged side-by-side and transversally spaced one from another.

In some embodiments, the second ribs 62 have a square or rectangular transversal section, as shown in FIGS. 4 and 7. In principle, however, they may have a different shape, e.g. frustoconical.

In general, as shown in FIG. 4, each second rib 62 has a given height h (the distance between the second coupling surface 60 and the free top surface 621 of each rib) and a given thickness t (the distance between opposite sides of each rib), which may be different relative to one another.

The manufacturing method of the disclosure then includes a step of providing the operating components 10 of the switching apparatus.

In general, the operating components 10 of the switching apparatus may be of a known type and, hereinafter, they will not be described in further details, for the sake of brevity. In the figures, the operating components 10 of the switching apparatus will be schematically represented as grey boxes for the sake of simplicity.

The manufacturing method of the disclosure then includes a step of assembling the first and second housing shells 3, 5 and the operating components 10 of the switching apparatus (FIGS. 2-7), in such a way to obtain a preliminary assembly 99 of the switching apparatus.

At this stage of the manufacturing method, the first and second housing shells 3, 5 are mutually coupled and define a volume in which most of the operating components 10 are accommodated (FIG. 3, 6).

The coupling between the first and second housing shells 3, 5 is achieved by coupling the first and second coupling edges 4, 6 of the first and second housing shells 3, 5.

Due presence of the above-mentioned first and second ribs 41, 62, the first and second coupling surfaces 40, 60 of the first and second coupling edges 4, 6 are kept spaced one from another, when the first and second coupling edges 4, 6 are coupled one to another.

Spacings 9 are therefore formed between the first and second coupling surfaces 40, 60 of the first and second coupling edges 4, 6 and the ribs 41, 62 themselves (FIGS. 4 and 7).

An important aspect of the disclosure consists in that one or more first ribs 41 of the first coupling edge 4 are overlapped and in contact to corresponding one or more second ribs 62 of the second coupling edge 6, when the first and second coupling edges 4, 6 are coupled one to another.

In practice, according to the disclosure, one or more first and second ribs 41, 62 of the first and second coupling edges 4, 6 have their top surfaces 411, 621 surfaces mutually overlapped and in contact one to another, when the first and second coupling edges 4, 6 are coupled one to another.

According to some embodiments of the disclosure (FIGS. 4 and 7), the first coupling edge 4 has multiple first ribs 41 overlapped and in contact to corresponding second ribs 62 of the second coupling edge 6, when the first and second coupling edges 4, 6 are coupled one to another.

The overlapping one or more pairs of ribs 41, 62 of the first and second coupling edges 4, 6 ensures the formation of enlarged spacings 9 between the first and second coupling surfaces 40, 60 of the first and second coupling edges 4, 6 and the ribs 41, 62 themselves. As it will better emerge from the following, the presence of these enlarged spacings 9 is important to improve the joining process of the coupling edges 4, 6 of the housing shells 3, 5.

FIGS. 4 and 7 show an embodiment of the disclosure, in which the first coupling edge 4 of the first housing shell 3 includes two central ribs 41a while the second coupling edge 6 of the second housing shell 5 includes two lateral ribs 62b at opposite sides of the coupling edge and two central ribs 62b.

When the first and second coupling edges 4, 6 are coupled, the lateral ribs 62a of the second coupling edge 6 have their top surfaces 621 in contact with the first coupling surface 40 of the first coupling edge 4 while the central ribs 41a, 62b of the first and second coupling edges 4, 6 are overlapped and have their top surfaces 411, 621 in contact on to another.

Conveniently, the lateral ribs 62a of the second coupling edge 6 have a height h corresponding to the spacing distance between the first and second coupling surfaces 40, 60 of the first and second coupling edges 4, 6 while the overlapped central ribs 41a, 62b of the first and second coupling edges 4, 6 have complementary heights, the sum of which corresponds to the spacing distance between the first and second coupling surfaces 40, 60.

The skilled person will certainly understand that the first and second ribs 41, 62 may be designed according to configurations different from that shown in FIGS. 4 and 7. However, it is important that the coupling edges 4, 6 have one or more pairs of ribs 41, 62 mutually overlapped and with their top surfaces 411, 621 in contact.

The manufacturing method of the disclosure then includes a step of joining the first and second coupling edges 4, 6 of the first and second housing shells 3, 5, after having assembled the first and second housing shells 3, 5 and the operating components 10 of the switching apparatus (FIGS. 8-13).

A permanent (i.e. no more separable) junction 19 between the first and second housing shells 3, 5 is thus formed (FIGS. 10 and 13) and a sealed outer casing 2 of the switching apparatus is obtained.

An important aspect of the disclosure consists in that the joint between the first and second coupling edges 4, 6 of the first and second housing shells 3, 5 is obtained through a vibration welding process.

During such a vibration welding process, the thermoplastic material of the first and second housing shells 3, 5 at the coupling edges 4, 6 melts at least partially and fills, at least partially, the spacings 9 formed between the first and second coupling surfaces 40, 60 and the first and second ribs 41, 62, when the first and second coupling edges 4, 6 are coupled.

The permanent junction 19, which is thus formed (FIGS. 10 and 13), ensures a strong mechanical connection between the first and second housing shells 3, 5 and, at the same time, an optimal sealing of the internal volume of the switching apparatus from the external environment, without using sealing gaskets.

The arrangement of pairs of overlapped ribs 41, 62 and the consequent formation of enlarged spacings 9 between the first and second coupling surfaces 40, 60 and the ribs 41, 62 greatly facilitates the formation of a sturdier junction 19 since a larger quantity of thermoplastic material can melt and distribute more uniformly along the junction section, during the welding process.

Figure 10:
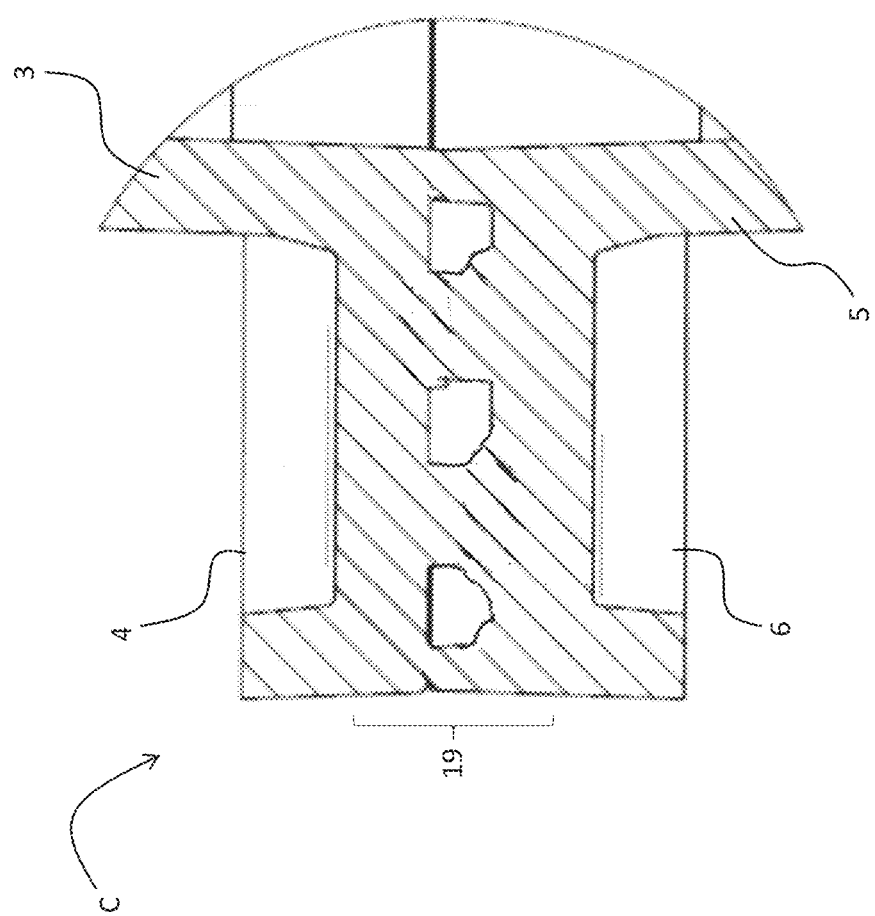
Figure 13:
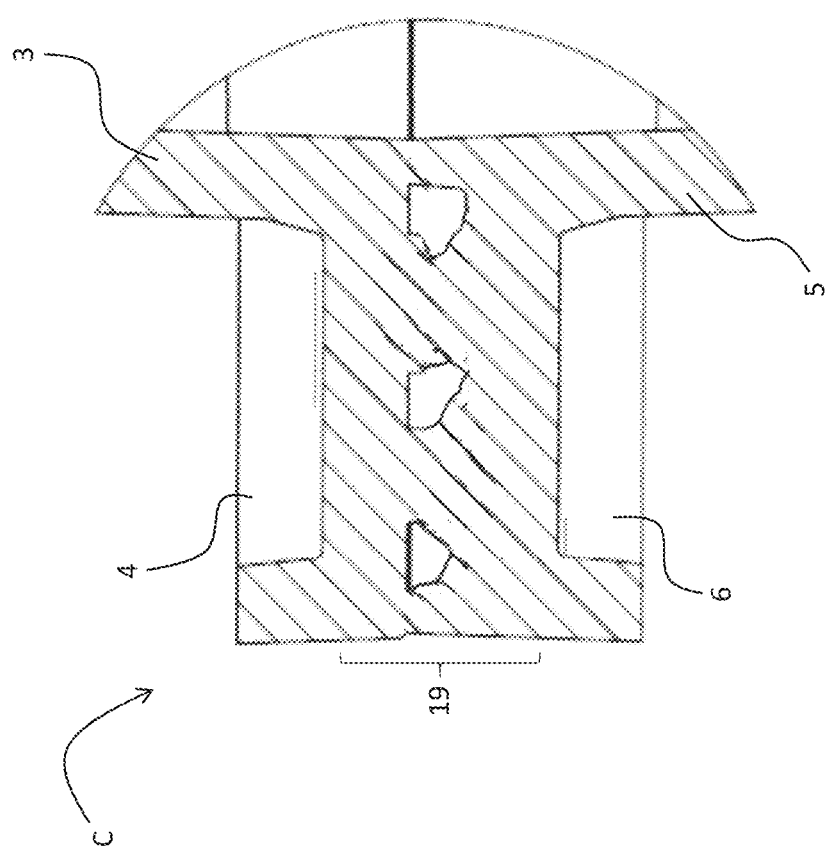

As shown in FIGS. 10 and 13, the junction 19 may still include some spacings not completely filled with thermoplastic material melt following the vibration welding process. Such spacings, however, have no relevant influence of the robustness and tightness of the mechanical connection between the first and second housing shells 3, 5.

In a practical implementation of the method of the disclosure, the vibration welding process, through which the first and second housing shells 3, 5 are joined, is carried out by means of a suitable vibration welding process apparatus (not shown).

Such a vibration welding process apparatus may be of a known type and, hereinafter, it will not be described in further details, for the sake of brevity.

In general, the first and second housing shells 3, 5 and the operating components 10 of the switching apparatus are assembled (as described above) in a welding chamber of the vibration welding apparatus, which is then activated in order to join the first and second housing shells 3, 5 through a vibration welding process.

During the vibration welding process, the first and second coupling edges 4, 6 of the first and second housing shells 3, 5 are moved back and forth, relative one to another, along a main vibration direction VD and with a predetermined frequency, e.g. about 100 Hz. Such a relative movement causes the heating by friction of thermoplastic material and the consequent melting of this latter.

As mentioned above, the first and second ribs 41, 62 of the first and second coupling edges 4, 6 follow the closed-line profile of these latter. They will include first portions 410, 620 and second portions 410a, 620a oriented along directions, which are respectively parallel and transversal (e.g. perpendicular) to the above-mentioned main vibration direction VD, when the first and second coupling edges 4, 6 are coupled (FIGS. 2, 3 and 5, 6).

According to some embodiments of the disclosure, the second portions 410a, 620a of the overlapped ribs 41a, 62b, which are oriented along directions transversal to the above-mentioned vibration direction VD, when the first and second coupling edges 4, 6 are coupled, have a larger thickness compared to the first portions 410, 620 of the overlapped ribs 41a, 62b, which are oriented along directions parallel to the vibration direction VD, when the first and second coupling edges 4, 6 are coupled (FIGS. 4 and 7).

In some embodiments, the main vibration direction VD is parallel to the main longitudinal axis of the switching apparatus.

Therefore, the first and second ribs 41, 62 of the first and second coupling edges 4, 6 includes longitudinal portions 410, 620 oriented along directions parallel to the longitudinal first and second sides 1A, 1B of the switching apparatus, when the first and second coupling edges 4, 6 are coupled (FIG. 3), and transversal portions 410a, 620a oriented along directions parallel to the transversal third and fourth sides 1C, 1D of the switching apparatus to the vibration direction VD, when the first and second coupling edges 4, 6 are coupled (FIG. 6).

As mentioned above, the above-mentioned longitudinal portions 410, 620 of the first and second ribs 41, 62 have a smaller thickness compared to the transversal portions 410a, 620a of the first and second ribs 41, 62 (FIGS. 4 and 7).

The solution provided by the above-mentioned embodiments of the disclosure ensures that that the coupled top surfaces 411, 621 of the overlapped ribs 41, 62 of the coupling edges 4, 6 are always in contact during the vibration welding process, even if the overlapped ribs 410, 620 move relative one to another according to a prevalent direction (the main vibration direction VD) transversal to their longitudinal direction (third and fourth sides 1C, 1D of the switching apparatus). In this way, an optimal quality of the welding process is achieved along the full perimeter of the coupled housing shells 3, 5.

According to some embodiments of the disclosure (FIG. 14), the step of assembling the first and second housing shells 3, 5 and the operating components 10 includes the following sub-steps:

assembling first operating components 10A of the switching apparatus to the first housing shell 3, so as to form a first sub-assembly 7 of the switching apparatus;

assembling second operating components 10B of the switching apparatus to the second housing shell 5, so as to form a second sub-assembly 8 of the switching apparatus;

assembling the first and second sub-assemblies 7, 8 and third components 10C of the switching apparatus, so as to obtain a preliminary assembly 99 of the switching apparatus.

The assembling of the first and second sub-assemblies 7, 8 may be realized with assembling techniques of known type, which are here not described in details for the sake of brevity.

In some embodiments, the first and second subassemblies 7, 8 of the switching apparatus are assembled in corresponding suitable jigs that are then positioned in the welding chamber of the vibration welding apparatus. The third operating components 10C of the switching apparatus are then assembled to the first and second assemblies 7, 8 within the welding chamber of the vibration welding apparatus before activating this latter for joining the first and second housing shells 3, 5 and obtaining a sealed outer casing 2.

These embodiments of the disclosure provide for a fully modular construction of the switching apparatus. As an example, the above-mentioned first and second components 10A, 10B may include fixed contacts and bushings of the switching apparatus intended to be fixed to the housing shells 3, 5 while the above-mentioned third components 10C may include internal moving parts (e.g. moving contacts or kinematic components) of the switching apparatus.

According to some possible variants of these embodiments of the disclosure (not shown), each first and second subassembly 7, 8 may form an electric pole of the switching apparatus. Obviously, in this case, the method of the disclosure may provide for forming a number of sub-assemblies of the switching apparatus corresponding to the overall number of electric poles. The sub-assemblies so obtained are then joined together through a vibration welding process.

According to other embodiments of the disclosure (FIG. 15), the step of assembling the first and second housing shells 3, 5 and the operating components 10 of the switching apparatus includes the following sub-steps:

assembling fourth operating components 10D of the switching apparatus to the second housing shell 5, so as to form a main sub-assembly 9 of the switching apparatus;

assembling the main sub-assembly 9, the first housing shell 3 and fifth operating components 10E of the switching apparatus, so as to obtain a preliminary assembly 99 of the switching apparatus.

The assembling of the main sub-assembly 9 may be realized with assembling techniques of known type, which are here not described in details for the sake of brevity.

In some embodiments, the main sub-assembly 9 of the switching apparatus is assembled in a corresponding jig that is then positioned in the welding chamber of the vibration welding apparatus. The first housing shell 3 and the fifth operating components 10E of the switching apparatus are then assembled to the main assembly 9 within the welding chamber of the vibration welding apparatus before activating this latter for joining the first and second housing shells 3, 5 and obtaining a sealed outer casing 2.

According to these embodiments of the disclosure, the first housing shell 3 is used just as a cover for a main assembly 9 of the switching apparatus, which includes fixed contacts and bushings (fourth operating components 10D) and internal moving parts (fifth operating components 10E) of the switching apparatus.

According to some embodiments of the disclosure, the method of the disclosure includes the step of pre-heating the first and second housing shells 3, 5 before joining the first and second coupling edges 4, 6 of the first and second housing shells 3, 5 through a vibration welding process.

In some embodiments, the first and second housing shells 3, 5 are heated at a softening temperature of the thermoplastic material, for example around 200° C. It has been seen that this solution allows further improving the welding process of the first and second housing shells 3, 5.

In some embodiments, the first and second housing shells 3, 5 of the switching apparatus are pre-heated in the welding chamber of the vibration welding apparatus, after a preliminary assembly 99 of the switching apparatus is obtained as described above.

In some embodiments, the method of the disclosure includes the step of filling the inner volume of the switching apparatus with a pressurized dielectric gas, after a sealed outer casing 2 of the switching apparatus is obtained as described above (FIGS. 8-13).

Conveniently, the injection of the dielectric gas in the internal volume of the switching apparatus may be realized according to solutions of known type, for example through a suitable inlet valve (not shown) arranged at a housing shell of the switching apparatus.

The method, according to the disclosure, may be subject to variants and modifications still falling within the scope of the disclosure. For example, the method of the disclosure may include the step of providing one or more additional housing shells in addition to the above-mentioned first and second housing shells 3, 5. These additional housing shells may be structured in a traditional manner or similarly to the first and second housing shells (i.e. they may include coupling edges with suitable coupling ribs) and then be joined to the above-mentioned first and second housing shells 3, 5 in a traditional manner or through a vibration welding process.

The method, according to the disclosure, provides remarkable advantages with respect to the known apparatuses of the state of the art.

According to the method of the disclosure, a sealed outer casing 2 of the switching apparatus is obtained by simply welding a pair of suitable housing shells 3, 5 of thermoplastic material. In this way, the adoption of mechanical fasteners and sealing gaskets for joining the housing shells in fully avoided. Additionally, since the housing shells 3, 5 are mutually welded, the coupling edges of the housing shells 3,5 do not need particular surface-finishing processes.

The method of the disclosure thus allows achieving relevant time savings in making the outer casing 2 of the switching apparatus. Additionally, it may be easily carried out, even by inexperienced personnel.

The method of the disclosure is particularly suitable for an industrial implementation. To this aim, standard manufacturing processes may be suitably employed for carrying out the various manufacturing steps. Additionally, adopting thermoplastic materials for the housing shells 3, 5 allows reducing effectively the overall industrial costs of the manufacturing method compared to the state of art solutions, in which epoxy resins are normally employed for realizing the housing shells of the outer casing.

The method of the disclosure can thus be industrially carried out at competitive costs compared to known manufacturing methods of the state of the art.

The invention claimed is:

1. A method for manufacturing a switching apparatus for electric systems, the method comprising the following steps:
providing a first housing shell of the switching apparatus, the first housing shell being of thermoplastic material and including a first coupling edge for coupling with another housing shell, the first coupling edge having a first coupling surface and first ribs protruding from the first coupling surface and extending along the first coupling edge;
providing a second housing shell of the switching apparatus, the second housing shell being of thermoplastic material and including a second coupling edge for coupling with the first housing shell, the second coupling edge having a second coupling surface and second ribs protruding from the second coupling surface and extending along the second coupling edge;
assembling the first and second housing shells and a plurality of operating components of the switching apparatus, thereby obtaining a preliminary assembly of the switching apparatus, wherein the first and second housing shells are coupled by coupling the first and second coupling edges of the first and second housing shells, wherein protruding portions of the one or more first ribs of the first coupling edge are overlapped and in contact to corresponding protruding portions of the one or more second ribs of the second coupling edge, when the first and second coupling edges of the first and second housing shells are coupled, and wherein one or more spacings are formed between the first and second coupling surfaces and the first and second ribs, when the first and second coupling edges of the first and second housing shells are coupled; and
joining the first and second coupling edges of the first and second housing shells through a vibration welding process, thereby forming a permanent junction between the first and second housing shells and obtaining a sealed outer casing for the switching apparatus.

2. The method according to claim 1, wherein, during the vibration welding process, the thermoplastic material of the first and second ribs of the first and second coupling edges melts at least partially and fills, at least partially, the one or more spacings formed between the first and second coupling surfaces and the first and second ribs.

3. The method according to claim 1, wherein the step of assembling the first and second housing shells and the operating components comprises:
assembling first operating components of the switching apparatus to the first housing shell, thereby forming a first sub-assembly of the switching apparatus;
assembling second operating components of the switching apparatus to the second housing shell, thereby forming a second sub-assembly of the switching apparatus;
assembling the first and second sub-assemblies and third operating components of the switching apparatus, thereby obtaining a preliminary assembly of the switching apparatus.

4. The method according to claim 1, wherein the step of assembling the first and second housing shells comprises:
assembling fourth operating components of the switching apparatus to the second housing shell, so as to form a main sub-assembly of the switching apparatus;
assembling the main sub-assembly, the first housing shell and fifth operating components of the switching apparatus, thereby obtaining a preliminary assembly of the switching apparatus.

5. The method according to claim 1, wherein the first and second housing shells and the operating components of the switching apparatus are assembled in a welding chamber of a vibration welding apparatus, the vibration welding apparatus being activated for joining the first and second coupling edges of the first and second housing shells through a vibration welding process.

6. The method according to claim 1, wherein the first ribs of the first coupling edge have different thicknesses and heights relative to one another.

7. The method according to claim 1, wherein the second ribs of the second coupling edge have different thicknesses and heights relative to one another.

8. The method according to claim 1, wherein, during the vibration welding process, the first and second coupling edges of the first and second housing shells are moved back and forth, relative to each other, along a main vibration direction,
wherein second portions of overlapped first and second ribs of the first and second coupling edges, which are oriented along directions transversal to the vibration direction when the first and second coupling edges are coupled, have a larger thickness compared to first portions of overlapped first and second ribs of the first and second coupling edges, which are oriented along directions parallel to the vibration direction, when the first and second coupling edges are coupled.

9. The method according to claim 1, further comprising the step of pre-heating the first and second housing shells before joining the first and second coupling edges of the first and second housing shells through a vibration welding process.

10. The method according to claim 1, further comprising the step of filling the inner volume of the switching apparatus with a pressurized dielectric gas, after the sealed outer casing of the switching apparatus is obtained.

11. The method according to claim 1, wherein the switching apparatus is a load-break switch for medium voltage electric systems.

* * * * *